(12) United States Patent
Choi et al.

(10) Patent No.: US 7,778,246 B2
(45) Date of Patent: Aug. 17, 2010

(54) METHOD AND APPARATUS FOR IP DATA TRANSMISSION USING LEGACY TRANSMISSION SYSTEM AND BROADBAND DOWNSTREAM TRANSMISSION SYSTEM IN HFC NETWORK

(75) Inventors: Dong-Joon Choi, Daejon (KR); Woong-Shik You, Daejon (KR); O-Hyung Kwon, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 516 days.

(21) Appl. No.: 11/606,152

(22) Filed: Nov. 29, 2006

(65) Prior Publication Data

US 2007/0127468 A1  Jun. 7, 2007

(30) Foreign Application Priority Data

Dec. 1, 2005 (KR) .................. 10-2005-0116175
Jul. 25, 2006 (KR) .................. 10-2006-0069904

(51) Int. Cl.
*H04L 12/28* (2006.01)
*H04N 7/173* (2006.01)

(52) U.S. Cl. ................ 370/389; 370/401; 725/111; 398/46

(58) Field of Classification Search .............. None
See application file for complete search history.

(56) References Cited

U.S. PATENT DOCUMENTS 6,747,979 B1 * 6/2004 Banks et al. .......... 370/401

2004/0218606 A1 11/2004 Leatherbury et al.
2004/0244043 A1 * 12/2004 Lind et al. .................. 725/111
2005/0086494 A1 * 4/2005 Carley ......................... 713/182
2005/0138669 A1 6/2005 Baran
2007/0248041 A1 * 10/2007 Seki ............................ 370/328

FOREIGN PATENT DOCUMENTS

KR      1020040015595      2/2004

OTHER PUBLICATIONS

Morello, A., et al., "DVB-S2—Ready for Lift off." Oct. 2004. *Ebu Technical Review*.
Notice of Korean Patent Grant dated May 17, 2007 for the corresponding application KR10-2006-0069904.

* cited by examiner

*Primary Examiner*—Gregory B Sefcheck
*Assistant Examiner*—Nima Mahmoudzadeh
(74) *Attorney, Agent, or Firm*—Ladas & Parry LLP

(57) ABSTRACT

Provided is an IP data transmission apparatus using a legacy transmission system and a broadband downstream transmission system in a HFC network. The IP data transmission apparatus includes: an headend unit for receiving data from an application server system that is a service providing apparatus, splitting the received data into general user data and management message, determining whether the general user is transmitted using a broadband or an existing service band, and transmitting the general user data through the HFC network; and a user cable terminal unit for receiving the split data transmitted from the headend unit through the HFC network, transmitting the received data to an IP based user device, and transferring the management message to the IP based user device through the legacy transmission system.

6 Claims, 6 Drawing Sheets

METHOD AND APPARATUS FOR IP DATA TRANSMISSION USING LEGACY TRANSMISSION SYSTEM AND BROADBAND DOWNSTREAM TRANSMISSION SYSTEM IN HFC NETWORK

FIELD OF THE INVENTION

The present invention relates to an apparatus and method for transmitting IP data using a legacy transmission system and a broadband downstream transmission system in an hybrid fiber coaxial cable (HFC) network for transmitting an IP based data using a newly introduced high-speed broad downstream cable MODEM and a conventional data over cable service interface specification (DOCSIS) based data transmission system; and, more particularly, to an apparatus and method for transmitting IP data using a legacy transmission system and a broadband downstream transmission system in an HFC network that enables the large amount of downstream data to be transmitted to an newly introduced high-speed downstream cable MODEM using an IP router at a head-end and a user terminal, and enables new services for user's requests to be effectively introduced by maximally utilizing conventional equipment using conventional upstream transmission channel.

DESCRIPTION OF RELATED ARTS

A cable MODEM terminal system (CMTS) and a cable MODEM (CM) employing the data over cable service interface specification (DOCSIS) 1.0, 1.1, or 2.0 have been widely used for transmitting data using a current cable network. Particularly, the current available downstream transmission specification was introduced in the beginning of 90s. As the new technologies have been introduced and the performance of the related hardware have been improved after the introduction of the downstream transmission specification, it is convenient and effective to adapt a new physical layer and a MAC layer not only for providing existing services but also for introducing new large capacity services.

In the conventional DOCSIS, the bandwidth of transmittable radio frequency (RF) for a downstream is limited to 6 MHz. That is, a cable MODEM (CM) can receives data within a bandwidth of 6 MHz, and the maximum transmit rate thereof is about 40 Mbps. However, the current used specifications come to the limits in capability and efficiency to provide related service as various communication and broadcasting merged services were introduced. In order to effectively provide the various communication and broadcasting merged services in the hybrid fiber coaxial cable (HFC) network, a cable MODEL terminal system (CMTS) for a DOCSIS based data transmission, which integrally includes a MAC processor, an network interface, a downstream modulator and a upstream demodulator has been evolved to a modularized CMTS configured of independent functional modules. Accordingly, new interface specifications for the modularized CMTS have been introduced.

The downstream modulator in the modularized CMTS includes not only a function for processing existing DOCSIS MAC data but also a function for processing MPEG-2 TS based audio/video data and IP based A/V data. However, it requires great cost and time for replacing all equipment of headends with new modularized equipment.

That is, it requires the high cost and the long time to provide services requested by users using equipment employing new specifications.

SUMMARY OF THE INVENTION

It is, therefore, an object of the present invention to provide an apparatus and method for transmitting IP data using a legacy transmission system and a broadband downstream transmission system in an hybrid fiber coaxial cable (HFC) network that allows a new broadband downstream cable MODEM to provide IP based data transmission services, which will be provided in the next generation cable network, with a cable MODEM terminal system (CMTS) in a conventional headend.

In accordance with an aspect of the present invention, there is provided an IP data transmission apparatus using a legacy transmission system and a broadband downstream transmission system in a hybrid fiber coaxial cable (HFC) network, the IP data transmission apparatus including: an headend unit for receiving data from an application server system that is a service providing apparatus, splitting the received data into general user data and management message, determining whether the general user is transmitted using a broadband or an existing service band, and transmitting the general user data through the HFC network; and a user cable terminal unit for receiving the split data transmitted from the headend unit through the HFC network, transmitting the received data to an IP based user device, and transferring the management message to the IP based user device through the legacy transmission system.

In accordance with an aspect of the present invention, there is also provided a method of transmitting IP data using a legacy transmission system and a broadband downstream transmission system in a hybrid fiber coaxial cable (HFC) network, including the steps of: a) setting an IP switching module in a terminal to transmit data from an external network to a broadband transceiving system through an IP router in an headend device, and to transmit data received at a terminal to an network having a corresponding user device; and b) setting an IP switching module in a user device to transmit data from a network having an IP based user through a legacy DOCSIS upstream transmission network.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, an apparatus and method for transmitting IP data using a legacy transmission system and a broadband downstream transmission system in an hybrid fiber coaxial cable (HFC) network will be described in more detail with reference to the accompanying drawings.

Figure 1:
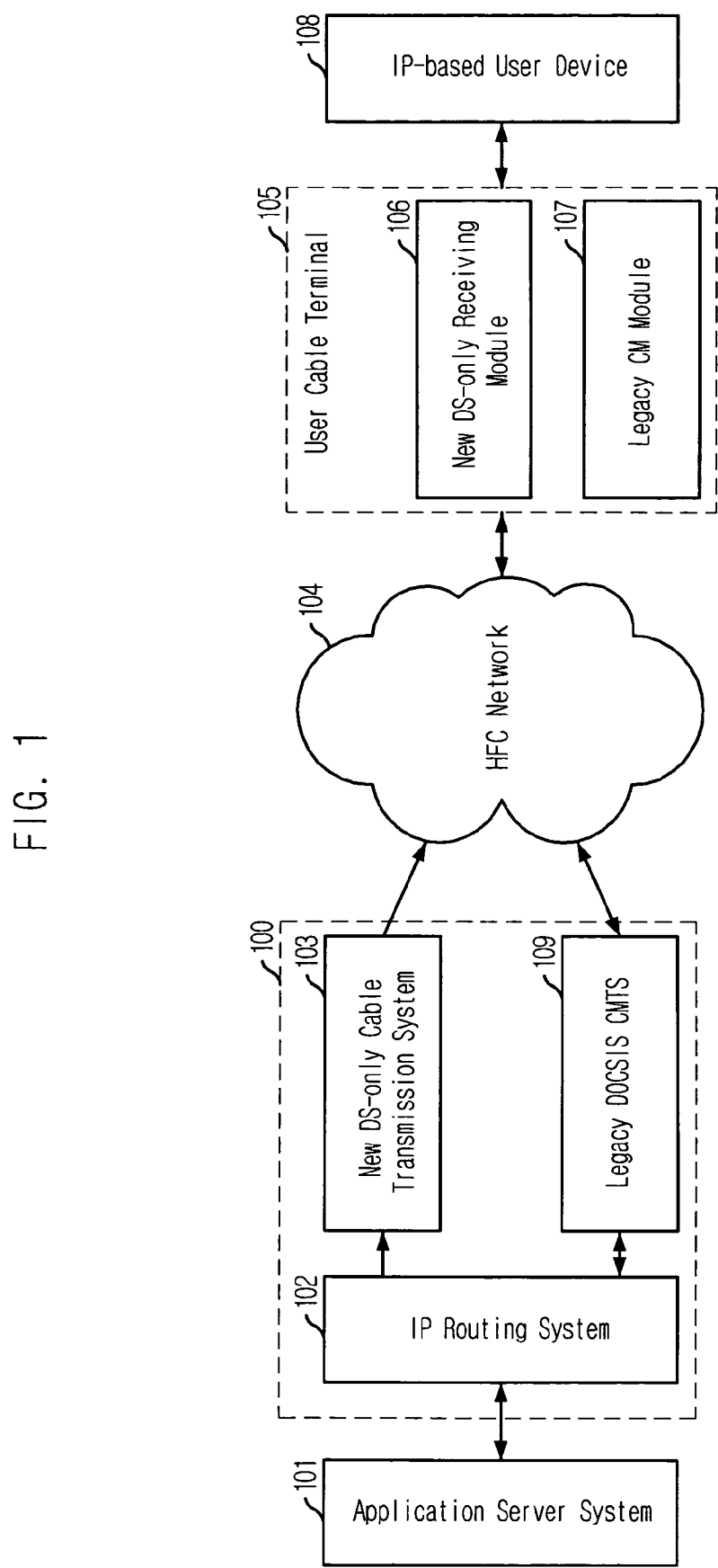
FIG. 1 is a block diagram illustrating an IP data transmission apparatus using a legacy transmission system and a broadband downstream transmission system in a hybrid fiber coaxial (HFC) network in accordance with an embodiment of the present invention.

FIG. 1 is a block diagram illustrating an IP data transmission apparatus using a legacy transmission system and a broadband downstream transmission system in a hybrid fiber coaxial (HFC) network in accordance with an embodiment of the present invention.

Referring to FIG. 1, the IP data transmission apparatus according to the present embodiment includes a headend device 100, and a user cable terminal 105. The headend device 100 receives data from an application server system 101 that is a service providing apparatus, splits the received data into general user data and a management message, determines whether the general user data is transmitted using a broadband or an existing service band, and transmits the general user data through the HFC. The user cable terminal 105 receives the split data transmitted from the headend device 100 through the HFC and transmits the received data to an IP based user device 108. The user cable terminal 105 also receives the management message from the IP based user terminal 108 and transfers the received management message through the conventional transmission system.

In the present embodiment, the headend device and the user terminal transmit large downstream data using the newly developed broadband downstream cable MODEM using an IP router, and transmit data requested from a user using a existing upstream transmission channel in order to effectively introduce various new services, which will be provided in the next generation cable network, by maximally utilizing the conventional equipment.

A new downstream (DS)-only cable transmission system 103 of the headend device 100 and the user cable terminal 105 of the broadband receiver module 106 support a new downstream physical layer or is a broadband downstream transceiver system using a channel bonding. Therefore, the upstream channel transmission is not included herein.

In order to bi-directional transmission between the headend device 100 and the IP based user device 108, the legacy DOCSIS MODEM terminal system 109 and a legacy cable MODEL module 107 are included, where the legacy DOCSIS MODEM terminal system 109 is a conventional DOCSIS based transceiver system. Herein, the upstream transmission is included. That is, the CMTS 109, which is in the headend device 100 and supports the conventional DOCSIS 2.0 or older, uses the DS-only cable transmission system 103 which is a new physical layer and uses a broadband receiver module 106 through the HFC network for transmitting the general user data from the external network or the application server system 101 that is a service providing device in the headend. The management message between the CMTS and the CM except the user data are transmitted using the legacy DOCSIS cable MODEM terminal system 109 that is a conventional physical layer and the conventional cable MODEM module 107.

An IP router system 102 in the IP layer determines whether the general user data is transmitted using the broadband or the existing service ban in the headend device 100. That is, the IP router system 102 routes downstream user data to the broadband downstream transmission system 103.

As described above, the user data and the management message are split, and the management message between the CMTS and the CM are transmitted through one physical layer because the management message contains less data than the user data. Therefore, the management message can be processed effectively. Also, a new service can be provided to a user having a conventional CM that does not support the above described transmission scheme within a boundary of conventional services and physical layer through the conventional physical layer and the conventional channel.

Figure 2:
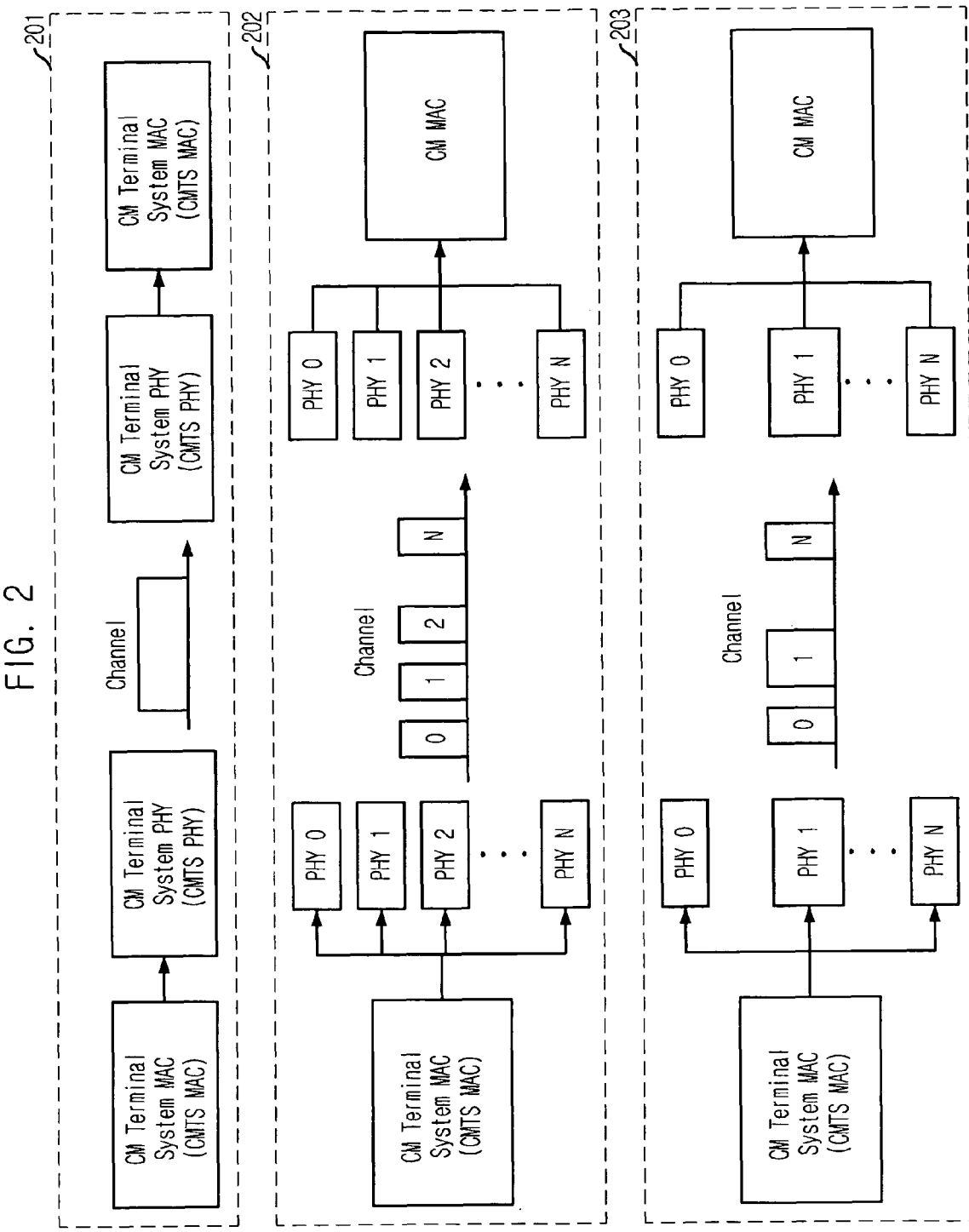
FIG. 2 is a block diagram illustrating broadband downstream transceiving scheme between the DS-only cable transmission system and the broadband receiver module shown in FIG. 1.

FIG. 2 is a block diagram illustrating broadband downstream transceiving scheme between the DS-only cable transmission system and the broadband receiver module shown in FIG. 1. That is, FIG. 2 shows a method of embodying a broadband downstream cable MODEM for providing various services such as a broadcasting service and a data service between a headend device and a user device using a cable network.

In order to provide various types of services, a service provider must allocate an additional band for each service, and a user requires a transceiver suitable for each service.

As the IP based service becomes popularized, services are multiplexed at the IP layer and transmitted without discrimination, which were provided through a designated service band through a cable network.

For example, it is a trend to provide the MPEG-2 TS based broadcasting from the IP layer.

In order to integrate and provide various services at the IP layer, which were provided from the conventional cable network, the downstream transmission should provide a high speed transmission rate and a wide transmission band.

As representative methods for embodying such a broadband downstream cable MODEM, a method 201 of using a single broadband carrier, a method 202 of combining a channel into a plurality of bands of 6 MHz and multiplexing them in a MAC layer, and a method 203 of combining a channel into a plurality of bands of predetermined times of 6 MHz, for example, 12 or 18 MHz, and multiplexing them in a MAC layer.

Figure 3:
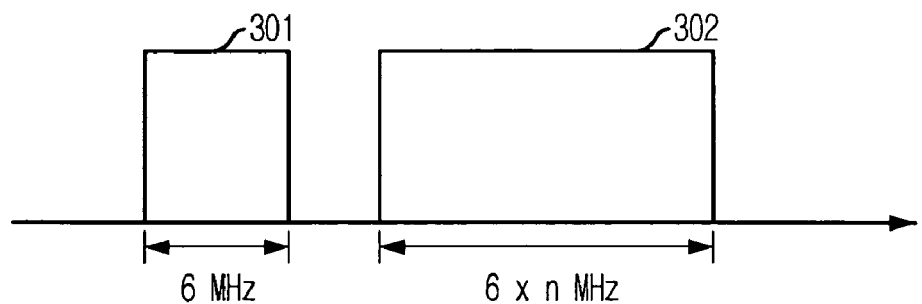
FIG. 3 is a diagram illustrating a conventional broadband downstream transmission in a conventional DOCSIS cable MODEM terminal system and a broadband downstream transmission band configuration in a new DS-only cable transmission system according to an embodiment of the present invention.

FIG. 3 is a diagram illustrating a conventional broadband downstream transmission in a conventional DOCSIS cable MODEM terminal system and a broadband downstream transmission band configuration in a new DS-only cable transmission system according to an embodiment of the present invention. That is, FIG. 3 shows frequency configuration of a conventional downstream and a new broadband downstream.

Referring to FIG. 3, a conventional service band 301 is a band that transmits a signal using a conventional physical layer, and a broadband 302 is a band that transmits the signal of a physical layer or a MAC layer.

The conventional service band 301 is a band allocated as a bandwidth of 6 MHz, and is a downstream transmission channel for providing service information. Currently, ITU-T J.83 Annex B is used in the DOCSIS.

In case of the broadband 302, a broadband is allocated to allow a service provider to effective use a channel without having the conventional 6 MHz band limitation.

The transmission scheme using the broadband 302 may select and use a new physical layer transmission technology such as 1024 QAM low density parity check (LDPC), which is not defined in the current standard.

Figure 4:
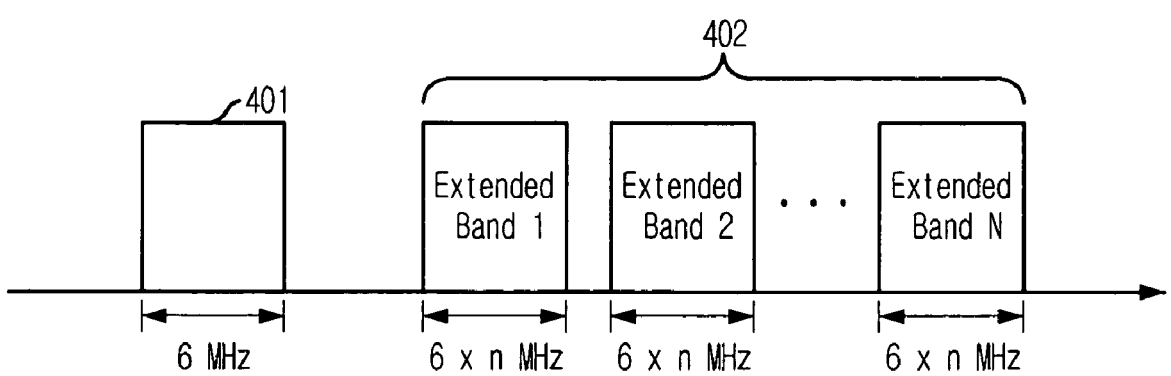
FIG. 4 is a diagram illustrating a conventional broadband downstream transmission in a conventional DOCSIS cable MODEM terminal system and a broadband downstream transmission band configuration in a new DS-only cable transmission system according to another embodiment of the present invention.

FIG. 4 is a diagram illustrating a conventional broadband downstream transmission in a conventional DOCSIS cable MODEM terminal system and a broadband downstream transmission band configuration in a new DS-only cable transmission system according to another embodiment of the present invention. That is, FIG. 4 shows a conventional downstream and a broadband downstream transmission band frequency configuration using channel bonding.

Referring to FIG. 4, a conventional service band 401 denotes a band that transmits a signal using a conventional physical layer, and a broadband 402 denotes a band that transmits a signal of a new physical layer or a MAC layer.

The channel bonding can transmits signal by combining a channel into a plurality of 6 MHz bands and multiplexing them in a MAC layer as shown in 202 of FIG. 2, or by combining a channel into a plurality of bands of multiples of 6 MHz, for example, 12 or 18 MHz, and multiplexing them in a MAC layer as shown in 203 of FIG. 2.

Figure 5:
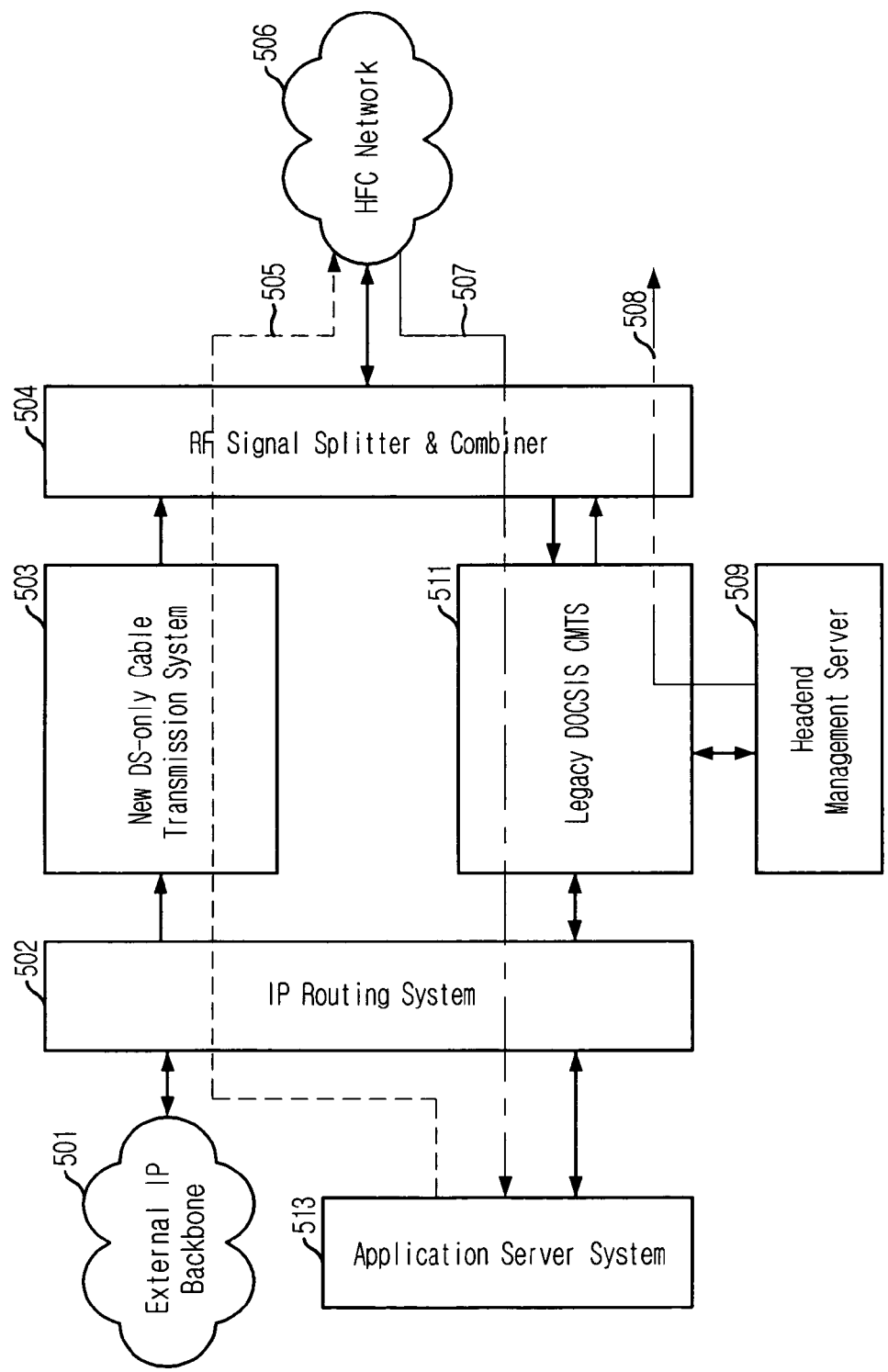
FIG. 5 is a block diagram illustrating a headend device of an IP data transmission apparatus using a legacy transmission system and a new DS-only cable transmission system in a HFC network in accordance with an embodiment of the present invention.

FIG. 5 is a block diagram illustrating a headend device of an IP data transmission apparatus using a legacy transmission system and a new DS-only cable transmission system in a HFC network in accordance with an embodiment of the present invention.

Referring to FIG. 5, the headend device includes an IP routing system 502, a new DS-only cable transmission system 503, a legacy DOCSIS cable MODEM terminal system CMTS 511, a headend managing server 509 and a RF signal divider/combiner 504. The IP routing system 502 splits data 505 transmitted from an application server system 513 into user data and management message, and determines whether the user data is transmitted using the broadband or the existing service band. The new DS-only cable transmission system 503 is a new broadband downstream transmission apparatus that transmit the user data determined in the IP routing system 502. The legacy DOCSIS CMTS 511 receives or transmits the management message decided in the IP routing system 502 through the existing band. The headend management server 509 manages the information related to services provided from the headend and manages the entire network. The RF signal splitter/combiner 504 splits and combines a transmitting/receiving RF signal.

The IP routing system 502 receives data 505 transmitted from an external IP back-born 501 which is an IP based external network or from the application server system 513 in the headend device, and transmit the received data 505 to the DS-only cable transmission system 503 that is a new broadband downstream transmission apparatus. Logically, the broadband transmission system of the headend and the terminal receiver form an IP subnet.

The conventional DOCSIS CMTS 511 receives data, which contains information about services provided from the headend and for managing the entire network, from the headend management server 509 and transmits the data 508 through the downstream band of 6 MHz. The conventional DOCSIS CMTS 511 receives requests and management message from the terminal through the upstream band and transfers the management message to the headend management server 509.

Figure 6:
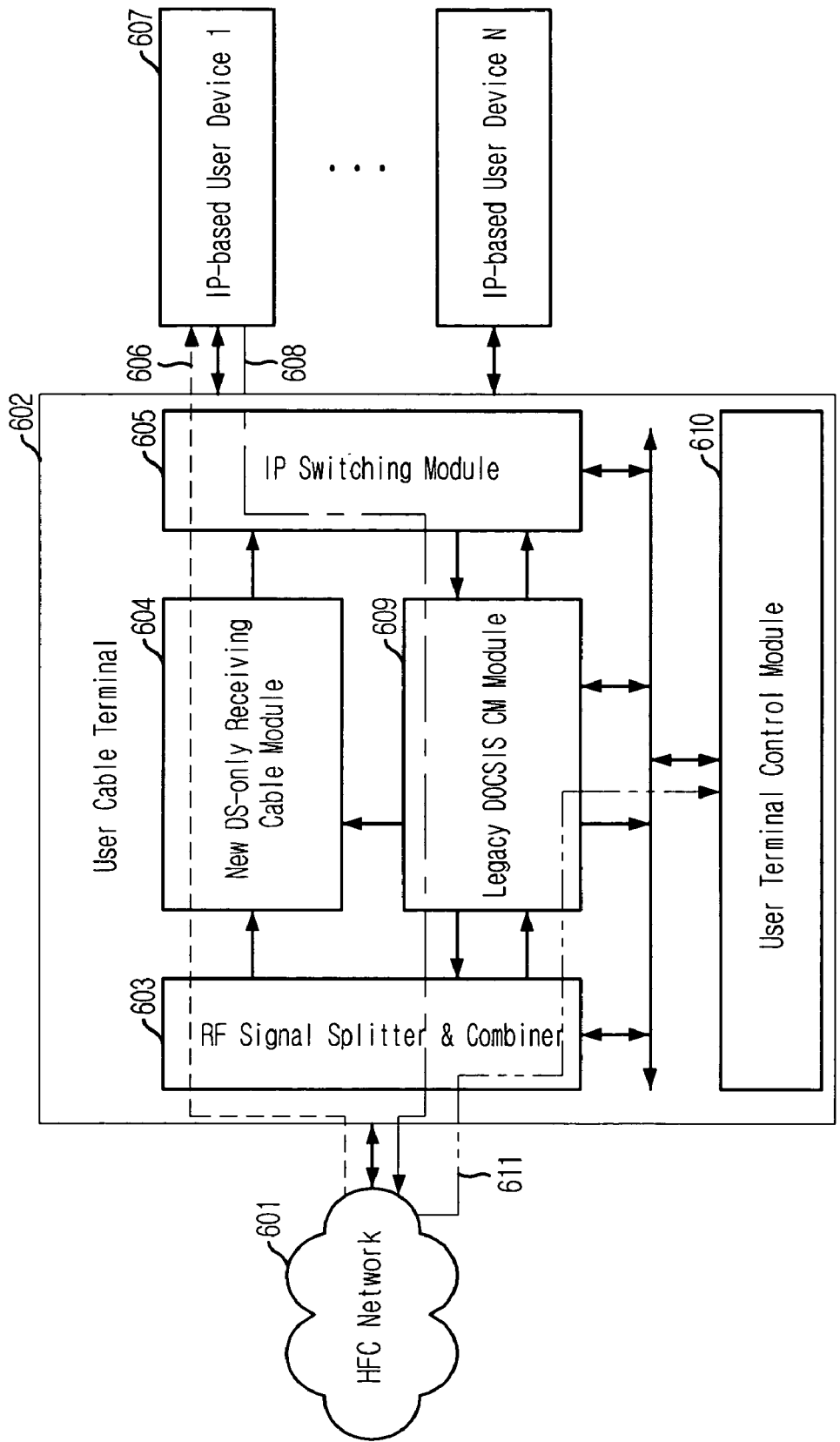
FIG. 6 is a block diagram illustrating a user cable terminal of an IP data transmission apparatus using a legacy transmission system and a DS-only transmission system in accordance with an embodiment of the present invention.

FIG. 6 is a block diagram illustrating a user cable terminal of an IP data transmission apparatus using a legacy transmission system and a DS-only transmission system in accordance with an embodiment of the present invention.

Referring to FIG. 6, a user cable terminal 602 according to the present embodiment includes a RF signal splitter/combiner 603, a new DS-only receiving cable module 604, an IP switching module 605, a legacy DOCSIS CM module 609, and a user terminal control module. The RF signal splitter/combiner 603 splits and combines transmitting/receiving signal through a HFC network 601. The new DS-only receiving cable module 604 processes broadband signal outputted from the RF signal splitter/combiner 603. The legacy DOCSIS CM module 609 processes data transmitted or received through the RF signal splitter/combiner 603. The IP switching module 605 transfers data 606 received from the DS-only receiving cable module 604 to a corresponding IP based user terminal 607, or transfers the user data transmitted from the IP based user terminal 607 to the headend device through the legacy GOCSIS CM module 609. The user terminal control module 610 controls the user cable terminal.

The data 606 from the DS-only receiving cable module 604 is transferred to a corresponding IP based user device 607 through the IP switching module 605 connected to the user cable terminal 602. Also, the user data 608 from the IP based user device 607 is transmitted from the IP switching module 605 that is a router module of the terminal 602 to the headend device through the legacy DOCSIS CM module 609.

Logically, a single IP subnet is formed between the legacy DOCSIS CMTS 511 and the user terminal control module 610.

Figure 7:
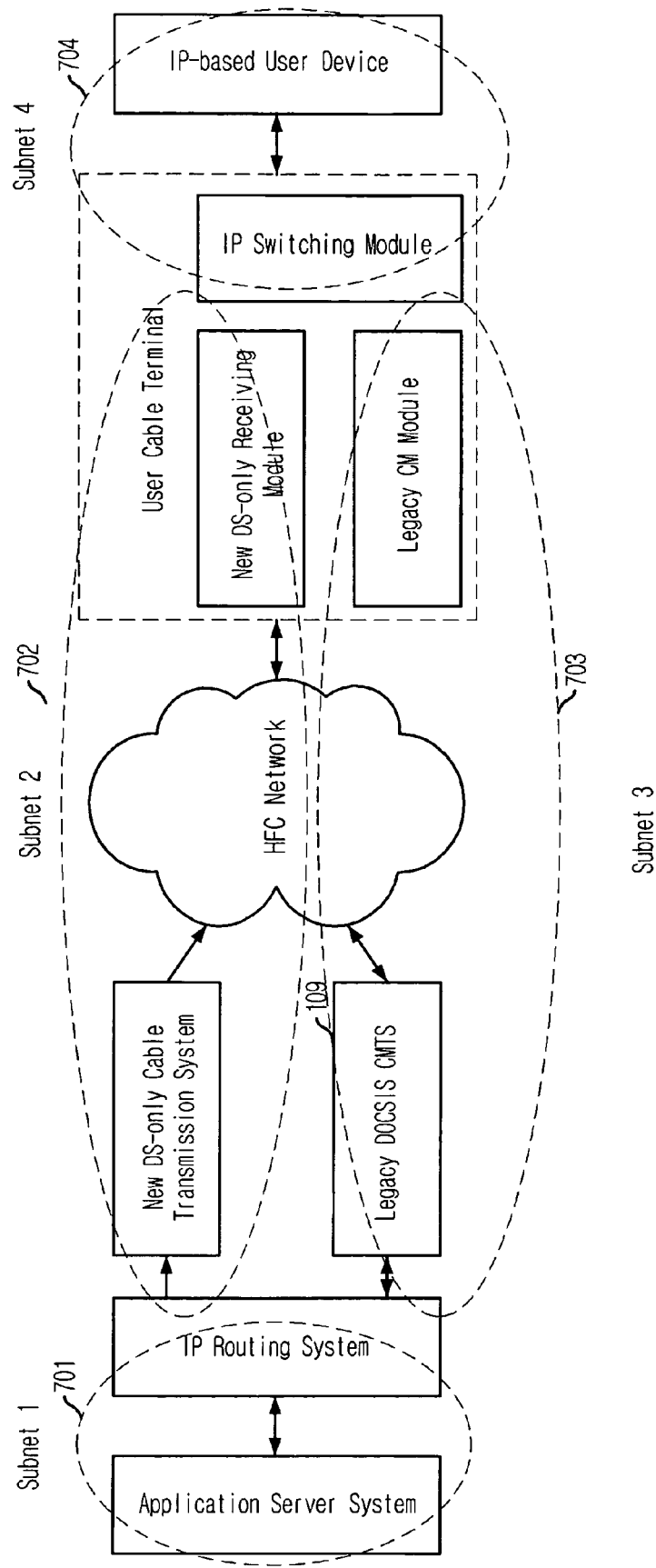
FIG. 7 is a block diagram illustrating a method of transmitting IP data using a legacy transmission system and a DS-only transmission system in accordance with an embodiment of the present invention.

FIG. 7 is a block diagram illustrating a method of transmitting IP data using a legacy transmission system and a DS-only transmission system in accordance with an embodiment of the present invention.

The present invention relates to IP based data transmission using a legacy transmission system and a DS-only transmission system. Substantially, the present invention is for providing services provided from the next generation cable network with low cost using a newly developed broadband downstream MODEM and existing equipment in the headend.

In order to transmit the IP based data using the legacy transmission system and the new DS-only transmission system, an IP router is added into a headend device and a terminal. The IP router of the headend device transmits the data of IP layer from an external back-born or an application server in the headend device through the broadband downstream channel, and the terminal transfers downstream data to a corresponding user device.

For appropriately transmit data in the IP layer, two independent logical subnets are formed between the headend device and the terminal.

Independent subnets 702 and 703 are formed for each of broadband transceiving and conventional DOCSIS transmission. The IP switching module is set to transmit data from the external network 701 to the broadband transceiving system through an IP router in the headend device, and to transmit the data received from the terminal to a network 704 in a corresponding user device.

The IP switching module of a user device is set to transmit data from a network 704 having an IP based user through the legacy DOCSIS upstream transmission network 703.

If the legacy DOCSIS transmission apparatus in the headend device includes a router, an additional subnet is required to be formed between the IP router and the CMTS. If the legacy DOCSIS transmission apparatus is driven in a bridge mode, a related operation can be performed with a subnet formed between the headend IP router and the terminal through the legacy DOCSIS based transmission system without forming the additional subnet.

As described above, the present invention enables the new developed broadband downstream cable MODEM to provide IP based data transmission service, which will be provided to the next generation cable network, with the legacy CMTS in the headend device.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application Nos. 2005-0116175 and 2006-0069904, filed with the Korean patent office on Dec. 1, 2005, and Jul. 25, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An IP data transmission apparatus using a legacy transmission system and a broadband downstream transmission system in a hybrid fiber coaxial cable (HFC) network, the IP data transmission apparatus comprising:

an headend means for receiving data from an application server system that is a service providing apparatus,
wherein the headend means is configured to transmit the received data using a broadband or an existing service band,
wherein the received data from the application server is split into general user data and management message, determining whether the general user data is transmitted using the broadband or the existing service band, and transmitting the general user data through the HFC network,
wherein the split management message is removed from being transmitted using the broadband in the HFC network and inserted for being transmitted using the existing service band in the HFC network; and
a user cable terminal means for receiving the split data transmitted from the headend means through the HFC network, transmitting the received data to an IP based user device, and transferring the management message to the IP based user device through the legacy transmission system,
wherein the headend means includes:
an IP routing means for splitting data transmitted from the application server system into general user data and management message, and determining whether the general user data is transmitted using a broadband or an existing service band;
a broadband downstream transmission means for transmitting the general user data determined in the IP routing means;
a legacy DOCSIS cable MODEM terminal means for transmitting or receiving the management message determined in the IP routing means through an existing band;

a headend managing means for managing information about services provided from the headend means and for managing the entire network; and
a first RF signal splitter and combiner means for splitting and combining a RF signal transmitted/received to/from the headend means.

2. The IP data transmission apparatus as recited in claim 1, wherein the user cable terminal means includes:

a second RF signal splitter and combiner means for splitting and combining signals transmitted/received to/from the HFC network;
a broadband receiving means for processing a broadband signal outputted from the second RF signal splitter and combiner means;
a legacy DOCSIS cable MODEM means for processing data transmitted or received through the second RF signal splitter and combiner means;
an IP switching means for transferring data from the broadband receiving means to a corresponding IP based user device, or transmitting user data from the IP based user device to the headend means through the legacy DOCSIS cable MODEM means; and
a terminal control means for controlling the user cable terminal means.

3. The IP data transmission apparatus as recited in claim 1, wherein the headend means uses an existing service band for transmitting a signal using an existing physical layer and a broadband using channel boding for transmitting a signal of a new physical layer or a MAC layer, and wherein the broadband transmits the signal using a method of combining a channel into a plurality of bands of 6 MHz and multiplexing them in a MAC layer, and a method of combining a channel into a plurality of bands of predetermined times of 6 MHz and multiplexing them in a MAC layer.

4. A method of transmitting IP data using a legacy transmission system and a broadband downstream transmission system in a hybrid fiber coaxial cable (HFC) network, comprising the steps of:

a) setting an IP switching module in a terminal to transmit data from an external network to a broadband transceiving system through an IP router in an headend device, and to transmit data received at a terminal to an network having a corresponding user device,
wherein the headend device is configured to transmit the received data using the broadband transceiving system or a legacy DOCSIS upstream transmission system; and
b) setting an IP switching module in a user device to transmit data from a network having an IP based user through the legacy DOCSIS upstream transmission network,
wherein the transmitting IP data is split in into general user data and management message and,
wherein the split management message is removed from being transmitted using the broadband transceiving system and inserted for being transmitted using the legacy DOCSIS upstream transmission system,
wherein the headend device includes:
splitting data transmitted into general user data and management message, and determining whether the general user data is transmitted using a broadband or an existing service band;
transmitting the general user data determined in the IP router;
transmitting or receiving the management message determined in the IP router through an existing band;

managing information about services provided from the headend device and for managing the entire network; and splitting and combining a RF signal transmitted/received to/from the headend device.

5. The method as recited in claim 4, wherein in the step a), logical subnets are independently formed between a headend device and a terminal according to broadband transceiving and legacy DOCSIS transmission for appropriately transmitting data in an IP layer.

6. The method as recited in claim 4, wherein in the steps b), an additional subnet is formed between an IP router and a cable MODEM terminal system if a router is embedded in a legacy DOCSIS transmission apparatus in the headend, and an operation is performed with a subnet configuration through a legacy DOCSIS transmission system between a headend IP router and a terminal without the additional subnet in case of a bridge mode.

* * * * *